United States Patent
Komsky et al.

(10) Patent No.: US 10,812,622 B1
(45) Date of Patent: Oct. 20, 2020

(54) CENTRALIZED AUTOMATION SYSTEM FOR SERVICE MANAGEMENT

(71) Applicant: TD Ameritrade IP Company, Inc., Omaha, NE (US)

(72) Inventors: Glenn Jared Komsky, Hoboken, NJ (US); Chibo Qian, Great Neck, NY (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 29 days.

(21) Appl. No.: 16/371,062

(22) Filed: Mar. 31, 2019

(51) Int. Cl.
  *H04L 29/08* (2006.01)
  *G06F 9/445* (2018.01)
  *G06F 3/0482* (2013.01)
  *G06F 9/451* (2018.01)

(52) U.S. Cl.
  CPC .......... *H04L 67/327* (2013.01); *G06F 3/0482* (2013.01); *G06F 9/44505* (2013.01); *G06F 9/452* (2018.02); *H04L 67/26* (2013.01)

(58) Field of Classification Search
  CPC .... G06F 3/0482; G06F 9/452; G06F 9/44505; H04L 67/26; H04L 67/327
  See application file for complete search history.

(56) References Cited

U.S. PATENT DOCUMENTS

| | | | |
|---|---|---|---|
| 7,178,059 B2* | 2/2007 | Greenspan | H04L 29/06 714/10 |
| 10,462,261 B2* | 10/2019 | Rajendran Pillai Sarojini | H04L 41/0866 |
| 2003/0226059 A1* | 12/2003 | Braun | G06F 11/3055 714/20 |
| 2004/0205167 A1* | 10/2004 | Grumann | G06F 11/0706 709/220 |
| 2008/0005367 A1* | 1/2008 | Barry | H04L 41/082 710/8 |
| 2008/0140829 A1* | 6/2008 | Berbiguier | G06F 11/2023 709/224 |
| 2015/0007171 A1* | 1/2015 | Blake | G06F 9/45558 718/1 |
| 2018/0123876 A1* | 5/2018 | Tang | H04L 41/0803 |

* cited by examiner

*Primary Examiner* — Jason D Recek
(74) *Attorney, Agent, or Firm* — Harness, Dickey & Pierce, P.L.C.

(57) ABSTRACT

A system includes a management data store configured to store configuration information for a service and reboot information for a server that hosts the service. The system also includes an execution module configured to: generate (i) a configuration file and (ii) a reboot script and push (i) the configuration file and (ii) the reboot script out to the server. The configuration file includes a location of at least one management script (i) associated with the service and (ii) stored on the server. The execution module is configured to obtain a status of the service on the server by executing the at least one management script on the server. The system also includes an operator portal configured to create a first user interface for display to a user. The first user interface includes a name of the service, a name of the server, and the status of the service.

20 Claims, 15 Drawing Sheets

Services Server/Services User Groups Service Groups Administrators General Buttons Button/ServiceGroups

300

| Services | | 301 | 302 | 303 | 304 | 305 | 306 | 307 | 308 | 309 |
|---|---|---|---|---|---|---|---|---|---|---|
| | Service | | Description | Start_Cmd | Stop_Cmd | Restart_Cmd | Status_Cmd | Cmd_User | Svc_Usergrou | Actions |
| | [X] | | [X] | [X] | [X] | [X] | [X] | All ▼ [X] | All ▼ [X] | |
| | Service1 | | Description1 | app/location1/service1/start | app/location2/service1/stop | app/location3/service1/restart | app/location4/service1/status | User1 | MW | |
| | Service2 | | Description2 | app/location1/service2/start | app/location2/service2/stop | app/location3/service2/restart | app/location4/service2/status | User2 | MW | |
| | Service3 | | Description3 | app/location1/service3/start | app/location2/service3/stop | app/location3/service3/restart | app/location4/service3/status | User1 | MW | |
| | Service4 | | Description4 | app/location1/service4/start | app/location2/service4/stop | app/location3/service4/restart | app/location4/service4/status | User2 | MW | |
| | Service5 | | Description5 | app/location1/service5/start | app/location2/service5/stop | app/location3/service5/restart | app/location4/service5/status | User1 | MW | |
| | Service6 | | Description6 | app/location1/service6/start | app/location2/service6/stop | app/location3/service6/restart | app/location4/service6/status | User1 | MW | |

Advanced Search   Export to CSV   Reload Grid

| Services | Server/Services | User Groups | Service Groups | Administrators | General Buttons | Button/ServiceGroups |
|---|---|---|---|---|---|---|

Server Services

| Server | Service | Auto_Start | Setting | Start_Order | Status | Last_Check | Last_Log | Actions |
|---|---|---|---|---|---|---|---|---|
| | | All ▼ ✕ | All ▼ ✕ | All ▼ ✕ | All ▼ ✕ | ✕ | ✕ | |
| Server1 | Service1 | YES | UP | 1 | UP | 12/04/2014 09:15:01 | Status command issued for instance Service1 | |
| Server2 | Service1 | YES | UP | 1 | UP | 12/04/2014 09:15:01 | Status command issued for instance Service1 | |
| Server3 | Service2 | YES | UP | 1 | UP | 12/04/2014 09:15:01 | Status command issued for instance Service2 | |
| Server4 | Service2 | YES | UP | 1 | UP | 12/04/2014 09:15:01 | Status command issued for instance Service2 | |
| Server5 | Service3 | | | | | 15:01 | Status command issued for instance Service3 | |
| Server6 | Service4 | | | | | 15:01 | Status command issued for instance Service4 | |

314 → Add Record
- Server:
- Service: Service1 ▼
- Auto_Start: Yes ▼
- Settings: UP ▼
- Start_Order: 1 ▼

315 → [Submit] [✕ Cancel]

Advanced Search · Export to CSV · ✕ Reload Grid 317, 316

| Group by: Service 426 | | | | | | | | | My View |
|---|---|---|---|---|---|---|---|---|---|
| Service Usergroup 402 | Service 404 | Service_Status 406 | AssetLifecycleStatus 408 | DNS_Host_Name 410 | TADDM_FQDN 412 | Application_Service 414 | Building 416 | IP_Address 418 | Model_Number 420 |
| All ▼ X | ▼ X | All ▼ X | All ▼ X | X | X | X | All ▼ X | All ▼ X | All ▼ X |
| SEBS | Service7 | DOWN \| DOWN | Deployed | Server17 | Server17.clientsys.local | Service7Description | Building1 | IP_Address1 | Virtual Server |
| SEBS | Service7 | DOWN \| UP | Deployed | Server18 | Server18.clientsys.local | Service7Description | Building1 | IP_Address2 | Virtual Server |
| SEBS | Service7 | DOWN \| UP | Deployed | Server19 | Server19.clientsys.local | Service7Description | Building1 | IP_Address3 | Virtual Server |
| SEBS | Service7 | DOWN \| UP | Deployed | Server20 | Server20.clientsys.local | Service7Description | Building1 | IP_Address4 | Virtual Server |
| SEBS | Service7 | UP \| UP | Deployed | Server21 | Server21.clientsys.local | Service7Description | Building2 | IP_Address5 | Virtual Server |
| SEBS | Service7 | UP \| UP | Deployed | Server22 | Server22.clientsys.local | Service7Description | Building2 | IP_Address6 | Virtual Server |
| SEBS | Service7 | UP \| UP | Deployed | Server23 | Server23.clientsys.local | Service7Description | Building2 | IP_Address7 | Virtual Server |
| SEBS | Service7 | UP \| UP | Deployed | Server24 | Server24.clientsys.local | Service7Description | Building2 | IP_Address8 | Virtual Server |
| SEBS | Service7 | UP \| UP | Deployed | Server25 | Server25.clientsys.local | Service7Description | Building2 | IP_Address9 | Virtual Server |
| SEBS | Service7 | UP \| UP | Deployed | Server26 | Server26.clientsys.local | Service7Description | Building2 | IP_Address10 | Virtual Server |
| ⊟ SERVICE8 | | | | | | | | | |
| PG_PROD | Service8 | UP \| UP | Deployed | Server27 | Server27.associatesys.local | Service8Description | Building2 | IP_Address11 | Virtual Server |
| PG_PROD | Service8 | UP \| UP | Deployed | Server28 | Server28.associatesys.local | Service8Description | Building1 | IP_Address12 | Virtual Server |
| PG_PROD | Service8 | UP \| UP | Deployed | Server29 | Server29.associatesys.local | Service8Description | Building2 | IP_Address13 | Virtual Server |
| ⊟ SERVICE9 | | | | | | | | | |
| MW | Service9 | DOWN \| DOWN | Deployed | Server14 | Server14.clientsys.local | Service9Description | Building2 | IP_Address14 | Blade Server |
| MW | Service9 | UNKNOWN | Deprovisioning in progress | Server30 | Server30.clientsys.local | Service9Description | Building2 | IP_Address15 | Blade Server |
| MW | Service9 | UP \| UP | Deployed | Server31 | Server31.clientsys.local | Service9Description | Building3 | IP_Address16 | Virtual Server |
| MW | Service9 | UP \| UP | Deployed | Server32 | Server32.clientsys.local | Service9Description | Building3 | IP_Address17 | Virtual Server |
| MW | Service9 | DOWN \| UP | Deployed | Server33 | Server33.clientsys.local | Service9Description | Building2 | IP_Address18 | Virtual Server |
| MW | Service9 | DOWN \| UP | Deployed | Server34 | Server34.clientsys.local | Service9Description | Building2 | IP_Address19 | Virtual Server |

Columns, Advanced Search, Refresh, Host Filter List, ✕ Reset Grid View, CSV Export  |< << | Page 1 of 25 | >> >| | 500 ▼   View 1-500 of 12,294

CENTRALIZED AUTOMATION SYSTEM FOR SERVICE MANAGEMENT

FIELD

The present disclosure relates to the management of services executing on a server and more particularly to the centralized control of multiple services executing on multiple servers.

BACKGROUND

An organization may run a plurality of services (applications) across multiple servers. Traditionally, the services are managed by a team of operators. Each operator may (i) possess detailed knowledge of and (ii) be responsible for the management of specific services and their respective execution environments. In additional to personally held knowledge, the details and instructions for managing the different services may be documented. As an example, a list of all the services and the servers on which they are executing may be stored in a spreadsheet.

The starting and stopping of services is a manual process that must be performed on each server that the service is hosted on. Large-scale work—such as system updates or failure recoveries—may require multiple system operators manually executing instructions on each server. Each operator must either rely on their personal knowledge or consult documentation for each service and server combination. In addition, the operators may need to coordinate their efforts to stop and/or start various services in a specific order, thus increasing the time and overhead required to carry out the work.

Although rebooting and patching may be planned in advance, they are often scheduled during off-peak hours to minimize the effect on users of the impacted services and servers. Thus, during reboots and patches, operators may need to be available during late-night hours or other non-standard working hours. Unexpected errors or issues may require the unscheduled and coordinated effort of multiple operators. During reboots, patching, or issue resolution, it is desirable to include operators that possess the required knowledge to limit the required time and avoid or resolve issues that may arise.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A service management system includes a management data store configured to store configuration information for a service and reboot information for a server that hosts the service. The system includes an execution module configured to: generate a configuration file based on the configuration information, generate a reboot script based on the reboot information, and push (i) the configuration file and (ii) the reboot script out to the server. The configuration file includes a location of at least one management script associated with the service and the at least one management script is stored on the server. The execution module is configured to obtain a status of the service on the server by executing the at least one management script on the server. The system further includes an operator portal configured to create a first user interface for display to a user. The first user interface includes a name of the service, a name of the server, and the status of the service.

In other features, the management data store is configured to store a button record that includes a general script file that may be executed on the server. The execution module is configured to selectively execute the general script file on the server. The name of the server is a first user selectable element and the operator portal is configured to, in response to selection of the first user selectable element: create a second user interface for display to the user that includes a second user selectable element that is associated with the button record, and in response to selection by the user of the second user selectable element, instruct the execution module to execute the general script file on the server.

In yet other features, the first user interface includes (i) a plurality of names of services and (ii) a user input element. The operator portal is configured to (i) filter the plurality of names of services based on input received via the user input element and (ii) create a third user interface for display to the user. The third user interface includes the filtered plurality of names of services.

In other features, the configuration file includes a location of a second management script (i) associated with the service and (ii) stored on the server. The execution module is configured to selectively execute the second management script on the server. The name of the service is a fourth user selectable element and the operator portal is configured to, in response to selection of the fourth user selectable element: create a fourth user interface for display to the user that includes a fifth user selectable element that is associated with the second management script, and in response to selection of the fifth user selectable element, instruct the execution module to execute the second management script on the server. Execution of the second management script causes the service to start or stop.

In yet other features, the service management system includes a scheduling module configured to: instruct the execution module to push the configuration file out to the server at a first predetermined interval and instruct the execution module to push the reboot script out to the server at a second predetermined interval. The second predetermined interval is greater than the first predetermined interval.

In further features, the scheduling module is configured to instruct the execution module to obtain the status of the service at the first predetermined interval. The operator portal is configured to, independent of operation of the scheduling module and in response to receiving a first input from the user, instruct the execution module to obtain the status of the service.

In yet further features, the first predetermined interval is 15 minutes and the second predetermined interval is 24 hours.

In other features, the management data store is configured to store the status of the service. The operator portal is configured to retrieve the status of the service from the management data store.

In yet other features, the reboot script includes instructions related to starting the service on the server after the server is rebooted. The first user interface includes an expected status of the service and the expected status is based on the instructions included in the reboot script.

In other features, the service management system includes an alert module configured to: receive a result of execution of the at least one management script from the execution module, based on the result, determine whether the status of the service cannot be obtained, and in response to determining that the status of the service cannot be obtained, generate and send an alert to the user.

A method includes obtaining (i) configuration information for a service and (ii) reboot information for a server that hosts the service and generating a configuration file based on the configuration information. The configuration file includes a location of at least one management script associated with the service and the at least one management script is stored on the server. The method further includes generating a reboot script based on the reboot information, pushing (i) the configuration file and (ii) the reboot script out to the server, and obtaining a status of the service on the server by executing the at least one management script on the server. The method also includes creating a first user interface for display to a user. The first user interface includes a name of the service, a name of the server, and the status of the service.

In other features, the method includes storing a button record that includes a general script file that may be executed on the server and creating, in response to selection of a first user selectable element, a second user interface for display to the user that includes a second user selectable element that is associated with the button record. The name of the server is the first user selectable element. The method also includes, in response to selection by the user of the second user selectable element, executing the general script file on the server.

In yet other features, the first user interface includes (i) a plurality of names of services and (ii) a user input element. The method further includes filtering the plurality of names of services based on input received via the user input element and creating a third user interface for display to the user. The third user interface includes the filtered plurality of names of services.

In other features, the configuration file includes a location of a second management script (i) associated with the service and (ii) stored on the server. The method further includes creating, in response to selection of a fourth user selectable element, a fourth user interface for display to the user that includes a fifth user selectable element that is associated with the second management script. The name of the service is the fourth user selectable element. The method also includes, in response to selection of the fifth user selectable element, executing the second management script on the server. Execution of the second management script causes the service to start or stop.

In yet other features, the method includes pushing the configuration file out to the server at a first predetermined interval and pushing the reboot script out to the server at a second predetermined interval. The second predetermined interval is greater than the first predetermined interval.

In further features, obtaining the status of the service includes obtaining the status (i) at the first predetermined interval and (ii) in response to receiving a first input from the user.

In yet further features, the first predetermined interval is 15 minutes and the second predetermined interval is 24 hours.

In other features, the reboot script includes instructions related to starting the service on the server after the server is rebooted. The first user interface includes an expected status of the service, and the expected status is based on the instructions included in the reboot script.

In yet other features, the method includes receiving a result of execution of the at least one management script on the server and determining, based on the result, whether the status of the service cannot be obtained. The method also includes, in response to determining that the status of the service cannot be obtained, generating and sending an alert to the user.

A non-transitory computer-readable medium storing processor-executable instructions, the instructions include storing, in a management data store, (i) configuration information for a service and (ii) reboot information for a server that hosts the service and generating a configuration file based on the configuration information. The configuration file includes a location of at least one management script associated with the service and the at least one management script is stored on the server. The instructions also include generating a reboot script based on the reboot information, pushing (i) the configuration file and (ii) the reboot script out to the server, obtaining a status of the service on the server by executing the at least one management script on the server, and creating a first user interface for display to a user. The first user interface includes a name of the service, a name of the server, and the status of the service.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 3-8 are example administrator user interfaces of a service management system according to the principles of the present disclosure.

FIGS. 9-13 are example user interfaces of a service management system according to the principles of the present disclosure.

In the drawings, reference numbers may be reused to identify similar and/or identical elements.

DETAILED DESCRIPTION

Introduction

Figure 1:
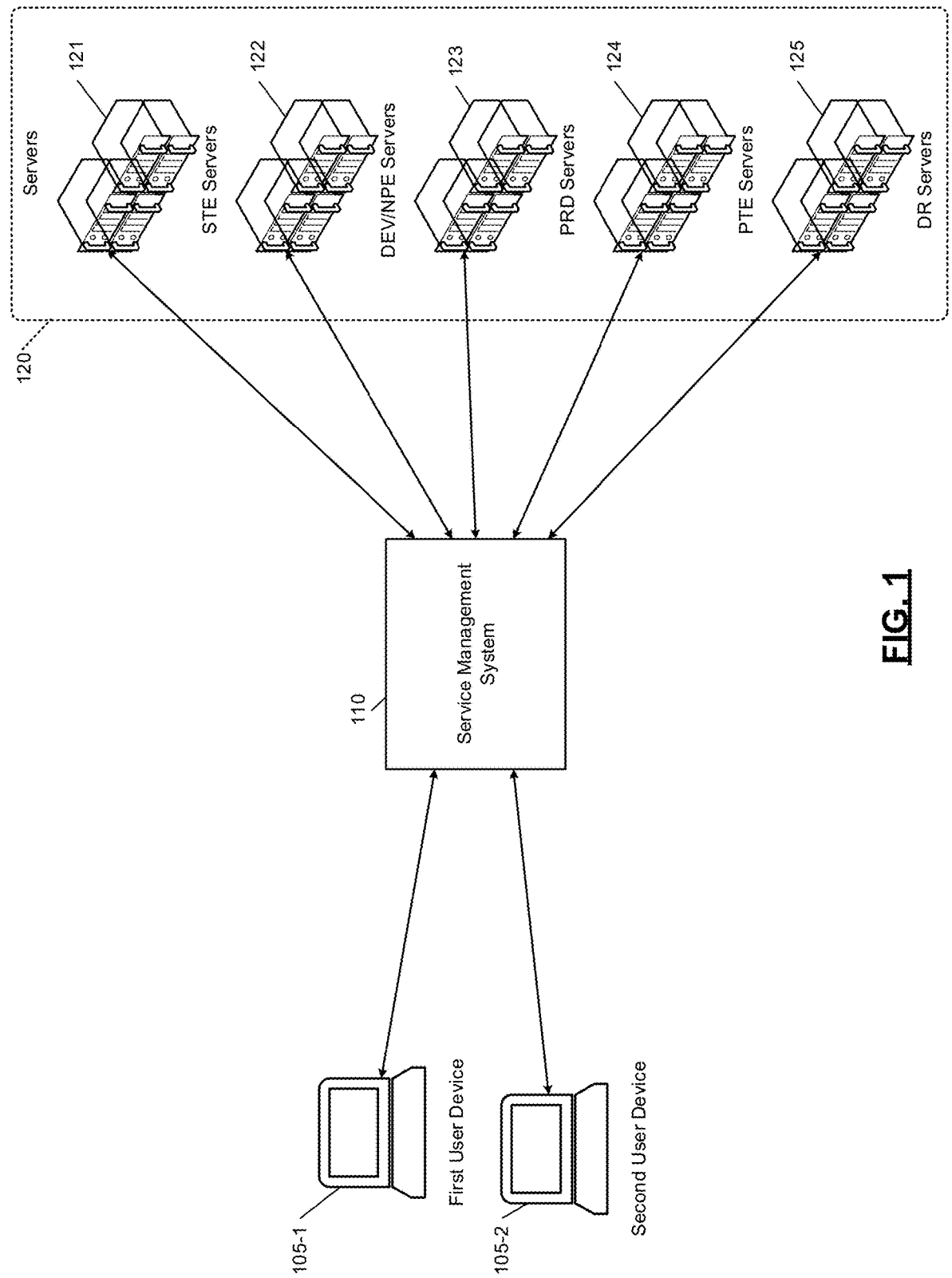
FIG. 1 is a functional block diagram of an example computing environment including a service management system according to the principles of the present disclosure.

In FIG. 1, a first user device 105-1 and a second user device 105-2 (collectively, user devices 105) communicate with a service management system 110. The service management system 110 communicates with servers 120 and controls services (applications) hosted on the servers 120. As shown in FIG. 1, the servers 120 may include standard track environment (STE) servers 121, development/non-production environment (DEV/NPE) servers 122, production (PRD) servers 123, platform test environment (PTE) servers 124, and disaster recovery (DR) servers 125. In various other implementations, the servers 120 may include additional or alternative types of servers, a subset of the servers shown in FIG. 1, etc.

The service management system 110 provides centralized control of the services running on the servers 120. Using the user devices 105, operators may start, stop, or obtain the status of each service. To manage the services, the service management system 110 remotely executes instructions on the servers 120. For example, the service management system 110 may execute commands or scripts that are stored locally on the servers 120. In addition, the service management system 110 may push out configuration files and scripts to the servers 120. The configuration files include the location of locally stored scripts and commands on each server. The scripts may include reboot scripts that are used when a server reboots. The reboot scripts may indicate which services should be started and the order in which they should be brought online. The reboot script for each server references the configuration file and the associated local scripts and commands stored on the server.

Figure 2:
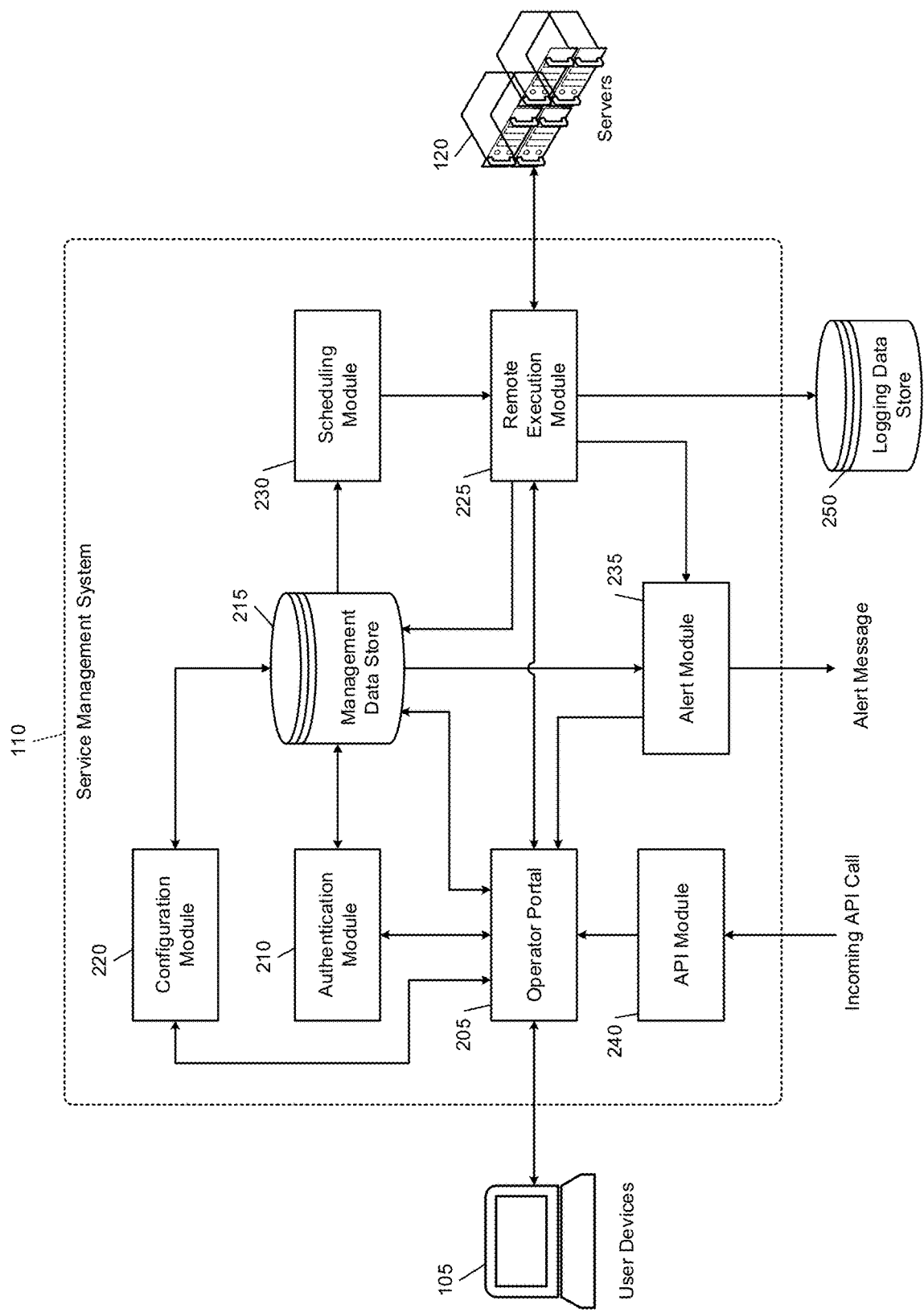
FIG. 2 is a functional block diagram of an example implementation of a service management system according to the principles of the present disclosure.

In FIG. 2, a functional block diagram of an example implementation of the service management system 110 includes an operator portal 205 and an authentication module 210. An operator may use one of the user devices 105 to access the service management system 110 via the operator portal 205. In some implementations, the operator portal 205 may be implemented as a web portal. The authentication module 210 receives credentials associated with the operator from the operator portal 205 and determines whether the operator is authorized to access the service management system 110. In some implementations, the authentication module 210 compares the received credentials to information stored in a management data store 215. In other implementations, the authentication module 210 communicates with an active directory system (not shown) to determine if the operator is authorized. The authentication module 210 provides an authorization status of the operator to the operator portal 205.

The operator portal 205 presents a user interface (UI) to the operator based on the received authorization status. The authorization status may indicate that the operator is an administrator or a standard user. An administrator is permitted to register new services and servers with the service management system 110. An administrator is also permitted to register standard users with the service management system 110 and assign them to specific services. A standard user is only able to use the service management system 110 to control services that have been assigned to the user. The authorization status may also indicate that the operator is a super administrator. In addition to the capabilities of an administrator, a super administrator is permitted to add new administrators to the service management system 110.

An administrator may use the operator portal 205 to register a service with the service management system 110. The operator portal 205 may prompt the administrator to enter information about the service—for example, the name of the service and a brief description of the service. The operator portal 205 stores the received information as a service record in the management data store 215.

A configuration module 220 creates a configuration file for each service registered with the service management system 110. The configuration file includes the location of scripts and commands that are local to the servers that host the service. The local scripts and commands are used to manage the service—for example, starting, stopping, and returning the status of the service. In some implementations, the configuration module 220 may automatically generate the configuration file for the service based on the service record stored in the management data store 215.

The administrator may also use the operator portal 205 to register a server with the service management system 110. The operator portal 205 may prompt the administrator to provide information about the server—for example, the name of the server. In response to receiving the name of the server, the operator portal 205 retrieves the address of the server and/or the operating system of the server from a configuration management database (not shown). In some implementations, the operator portal 205 may receive the information about the server from the administrator. The operator portal 205 stores the received or retrieved information as a server record in the management data store 215.

The operator portal 205 allows an administrator to associate a registered service with a registered server as a service and server combination. In some implementations, the operator portal 205 may present the administrator with a list of registered services and servers to select from. In other implementations, the administrator may provide the name of the service and/or the server via the operator portal 205. The administrator may provide additional information about the service and server combination—for example, whether the service should be automatically started upon restart of the server and the order in which the service should be brought online. The administrator may also provide the expected status of the service on the server.

The operator portal 205 stores the provided information about the service and server combination in the management data store 215. For example, the operator portal 205 may create an association between a service record and a server record in the management data store 215. The created association contains all of the provided information about the service and server combination.

The configuration module 220 creates and stores a reboot script for each registered server. The reboot script is used by the server to bring services online after the server is restarted. In some implementations, the configuration module 220 automatically generates the reboot script for a server based on the information about each service and server combination associated with the server that is stored in the management data store 215. For example, the configuration module 220 may automatically generate a reboot script for a Linux server based on the services associated with the server. The configuration module 220 stores the generated reboot script in the management data store 215.

In certain situations, the configuration module 220 may not be able to automatically create an appropriate configuration file for a service and/or an appropriate reboot script for a server based on information stored in the management data store 215. The administrator may generate the configuration file or reboot script based on personally held knowledge that differs from the information stored in the management data store 215—for example, due to recent changes not reflected in the information stored in the management data store 215 or to implement experimental configurations. The configuration module 220 may receive a file from the administrator via the operator portal 205 and store the received file in the management data store 215 as the configuration file for the service or the reboot script for the server.

The operator portal 205 also allows the administrator to register general scripts with the service management system 110. A general script is a script that may be executed on a server to carry out a task other than to start, stop, or obtain the status of a service. For example only, general scripts may be used to obtain the uptime of a server or to receive a report of the processor statistic associated with a server. The operator portal 205 may prompt the administrator to provide a name of the general script, a file that contains the general script, and a brief description of the general script. The operator portal 205 stores the information provided by the administrator in the management data store 215 as a general button record. The administrator may use the operator portal 205 to associate the general button record with a service group. The operator portal 205 records the association in the management data store 215.

The administrator may use the operator portal 205 to create service groups. The service management system 110 uses service groups to restrict control of services to selected operators. The operator portal 205 may prompt the administrator for a name of the service group and create a service group record with the provided name in the management data store 215. The operator portal 205 may also prompt the administrator to select which services and operators are associated with the service group. The operator portal 205 creates associations between the service group, the selected services, and operators in the management data store 215.

A remote execution module 225 communicates with the servers 120 and locally executes commands or scripts on the servers 120. To execute a command or script, the remote execution module 225 receives a name of the local command or script to execute and the address of the server that the command or script is to be executed on.

The remote execution module 225 may process received execution requests sequentially or in parallel. For example, in response to an operator entering instructions into the operator portal 205 to stop a service running on 10 different servers, the remote execution module 225 may execute the stop script on each server sequential or may simultaneously execute the stop script on two or more of the 10 servers. The remote execution module 225 may also pass along any files needed for the remotely executed commands or scripts. For example, the remote execution module 225 may retrieve a general script stored in the management data store 215 and send the general script to a server for execution.

After execution of a command or script, the servers 120 return the result of the execution to the remote execution module 225. The remote execution module 225 may store the received result in the management data store 215. The remote execution module 225 may also provide the results to the operator portal 205 which may visually present the results to the operator.

A scheduling module 230 periodically requests the status of each service stored in the management data store 215. The scheduling module 230 instructs the remote execution module 225 to execute the status script associated with each service stored in the management data store 215 on each server associated with the service. In response to executing each status script, the remote execution module 225 stores the received result of the execution as the status of the corresponding service and server combination in the management data store 215.

The scheduling module 230 may instruct the remote execution module 225 to obtain the status of each service and server combination at a predetermined time interval. In some implementations, the predetermined interval is 15 minutes. In other implementations, the predetermined interval is another suitable period of time—such as 10 minutes or 30 minutes.

Each time the remote execution module 225 executes a status script for a service, the remote execution module 225 pushes out the configuration file stored in the management data store 215 for the service to each server that is associated with the service.

The scheduling module 230 also periodically instructs the remote execution module 225 to push out the reboot scripts stored in the management data store 215. In some implementations, the scheduling module 230 instructs the remote execution module 225 to push out the reboot scripts at a predetermined time of day. The predetermined time of day may be set to minimize the impact on the servers—for example, late at night or early in the morning.

The operator may use the operator portal 205 to start or stop a registered service. The operator may start or stop the service on all of the servers that are associated with the service or on a subset of the servers associated with the service. The operator portal 205 instructs the remote execution module 225 to run the appropriate script—start or stop—on each server selected by the operator. The operator may also use the operator portal 205 to request the status of a registered service independently of the scheduling module 230. The operator portal 205 instructs the remote execution module 225 to obtain the status of a selected service by executing the associated status script on each server that is associated with the selected service.

An alert module 235 receives the results of each executed status script and monitors the results for errors. For example, the alert module 235 determines whether the status of a service has not been received after the remote execution module 225 receives a request to obtain the status of the service. In response to determining that the status of a service cannot be obtained, the alert module 235 generates an alert for the service. For example, the alert module may obtain the email address of one or more operators associated with the service from the management data store 215 and send an email notifying the one or more operators of the inability of the service management system 110 to obtain the status of the service. The email may include the name of the service, the date and value of the last status for the service stored in the management data store 215, and/or the number of failed attempts to obtain the status. In some implementations, the alert module 235 determines that the status of a service cannot be obtained in response to not receiving a status for the service after two consecutive requests to obtain the status of the service. In other implementations, the alert module 235 determines that the status of a service cannot be obtained in response to not receiving a status for the service after three or more consecutive requests to obtain the status of the service.

The operator portal 205 may also be accessed via an application programing interface (API) module 240. The API module 240 receives incoming API calls and provides instructions to the operator portal 205 that correspond to the incoming API calls. All of the functions of the operator portal 205 described above may be accessed through API calls via the API module 240. The API module 240 may enable a remote system—such as a high availability system (not shown)—to control the services and servers registered with the service management system 110.

The remote execution module 225 stores each request to execute a script or command received from the operator portal 205 or the scheduling module 230. In some implementations, the remote execution module 225 may store each request in a logging data store 250. In various implementations, the logging data store 250 may be independent of the service management system 110. In other implementations, the service management system 110 may include the logging data store 250. In various other implementations, the remote execution module 225 may provide the execution requests to a remote logging service (not shown) for storage.

As an example only, the remote execution module 225 may transmit the execution requests to a Splunk logging service.

Example User Interfaces

FIGS. 3-8 are example user interfaces (UIs) that may be presented by the operator portal 205 to an authorized administrator. In FIG. 3, a services listing UI 300 displays services that have been registered with the service management system 110. Each row of the services listing UI 300 represents a service record that is stored in the management data store 215. Each column of the services listing UI 300 displays an attribute of the service that corresponds to the service record. The services listing UI 300 displays the name 301 of each service and a brief description 302 of the service. For each listed service, the services listing UI 300 displays the relative locations of a start script 303, a stop script 304, a restart script 305, and a status script 306 for the service, if available. The services listing UI 300 also displays a username 307 that the scripts will be executed under on the server and a service group 308 that the service is associated with.

The administrator may filter the services displayed in the services listing UI 300 based on the displayed attributes. Specifically, the administrator may use a text entry box or a dropdown menu located near the top of each column to filter the list based on the attribute that corresponds to the respective column. The administrator may use the selectable elements in an actions 309 column to edit or delete a listed service.

In FIG. 4, an add server record UI 314 allows the administrator to register a server with the service management system 110 and associate the server with a registered service. The add server record UI 314 prompts the administrator to provide the name of the server and to select a service from a list of registered services. The add server record UI 314 also prompts the administrator to provide information about the service and server combination. For example, the administrator provides information about whether the service should be automatically started upon restart of the server, the order in which the service should be brought online, and the expected status of the service on the server. Selection of a submit button 315 results in the operator portal 205 adding a server record to the management data store 215 and associating the server record with the identified service using the provided information. The operator portal 205 may present the add server record UI 314 to the administrator in response to the selection of an add record icon 316 in a server service listing UI 317.

Figure 5:
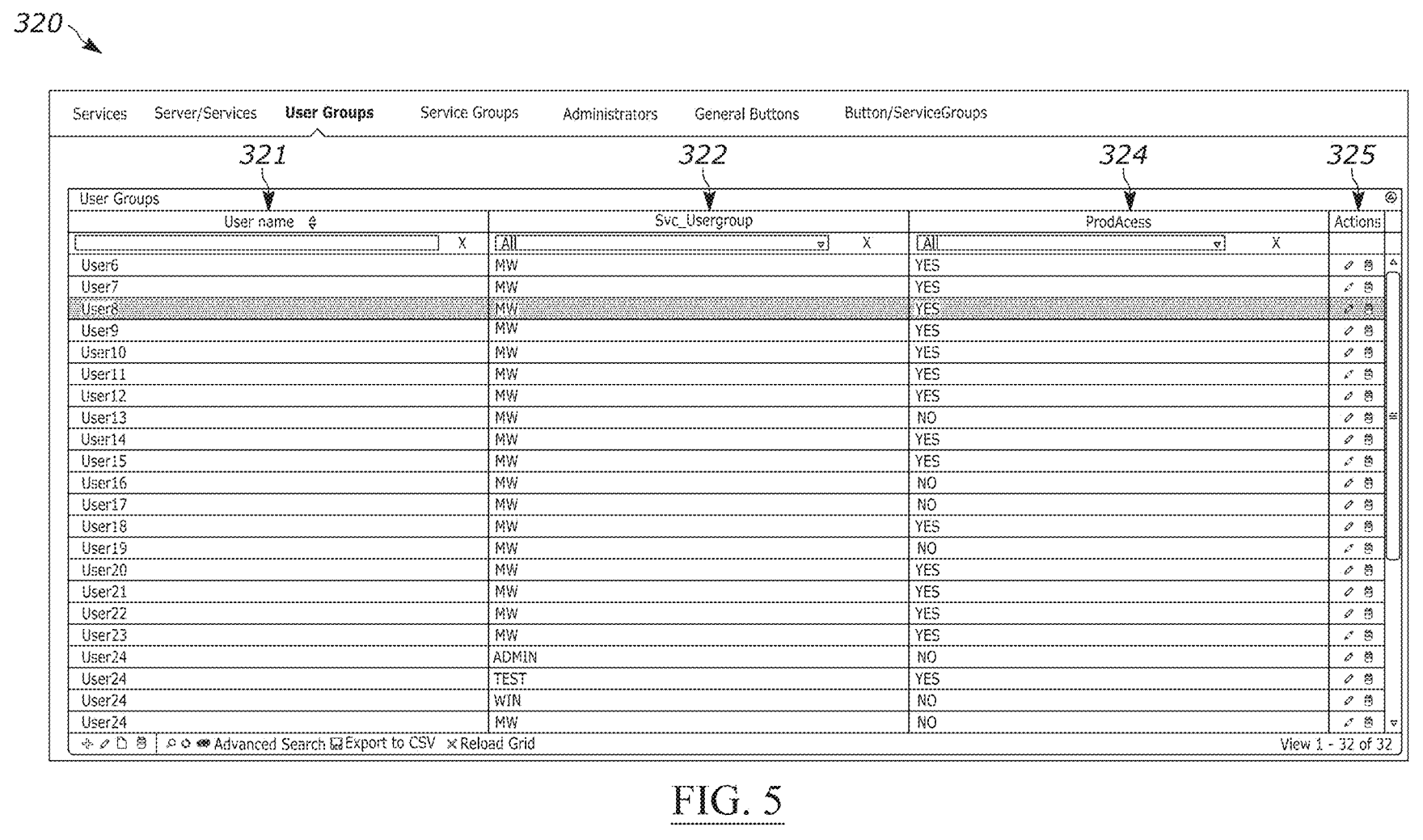

In FIG. 5, a user groups UI 320 displays a list of operators that are registered with the service management system 110. Each row of the user groups UI 320 represents an operator record that is stored in the management data store 215. Each column of the user groups UI 320 displays an attribute of the operator. For each listed operator, the user groups UI 320 displays a username 321 of the operator, a service group 322 associated with the operator, and a production access 324 that shows whether the operator has been granted access to production servers of the servers 120.

The administrator may use the selectable elements in an actions 325 column to edit or delete an operator displayed in the user groups UI 320. For example, the administrator may change the service group that an operator is associated with or may change the production access of an operator. The administrator may filter the operators displayed in the user groups UI 320 based on the displayed attributes. Specifically, the administrator may use a text entry box or a dropdown menu located near the top of each column to filter the list based on the attribute that corresponds to the respective column.

Figure 6:
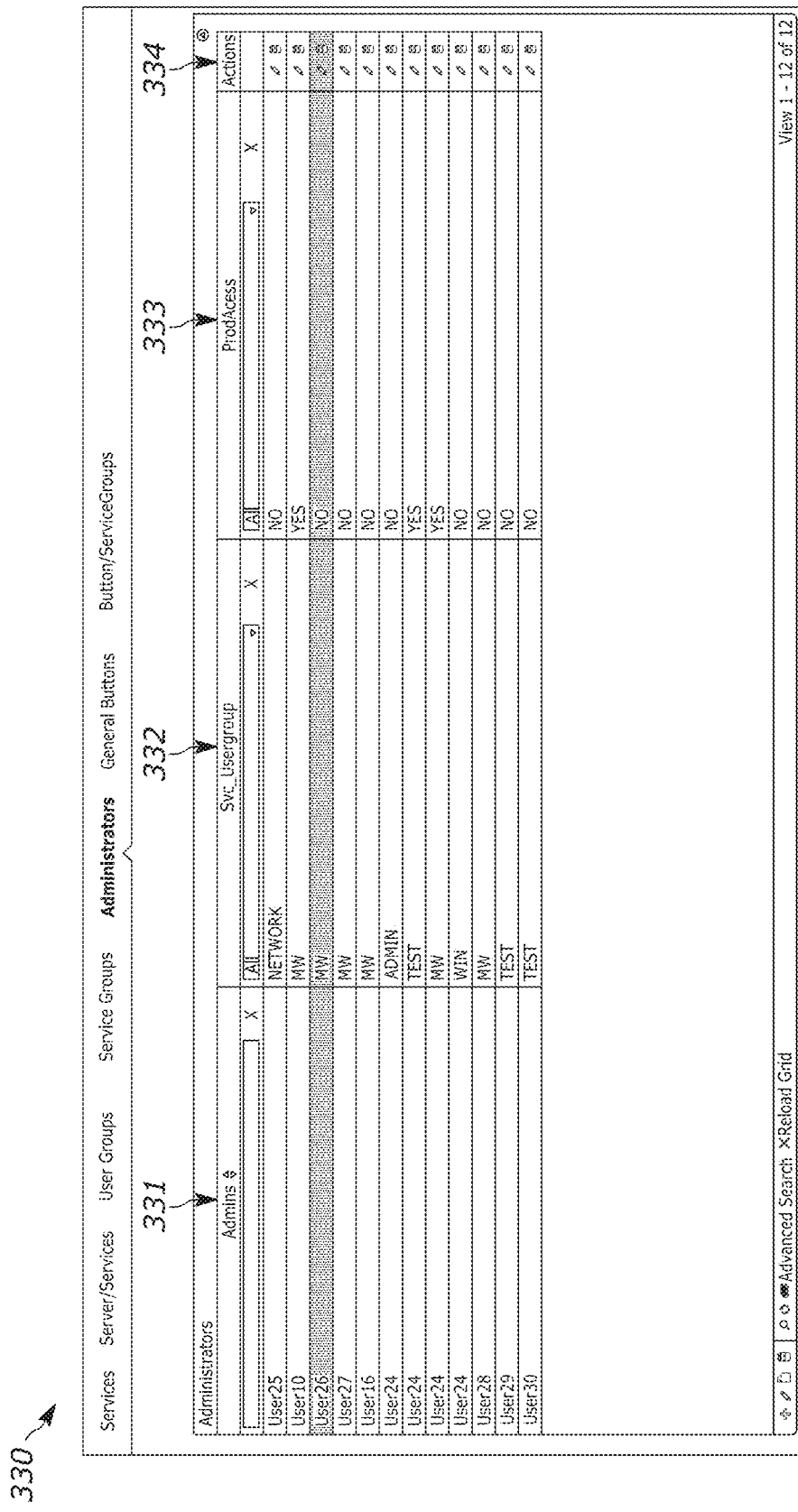

In FIG. 6, an administrator listing UI 330 displays a list of administrators of the service management system 110. The operator portal 205 may present the administrator listing UI 330 to a super administrator. Each row of the administrator listing UI 330 represents an authorized administrator. Each column of the administrator listing UI 330 displays an attribute of the administrator. For each listed administrator, the administrator listing UI 330 displays a username 331 of the administrator, a service group 332 associated with the administrator, and a production access 333 indicator that shows whether the administrator has been granted access to the production servers of the servers 120.

The super administrator may use the selectable elements in an actions 334 column to edit or delete an administrator displayed in the administrator listing UI 330. For example, the super administrator may change the service group that an administrator is associated with or the production access of an administrator. The super administrator may filter the administrators displayed in the administrator listing UI 330 based on the displayed attributes. Specifically, the super administrator may use a text entry box or a dropdown menu located near the top of each column to filter the list based on the attribute that corresponds to the respective column.

Figure 7:
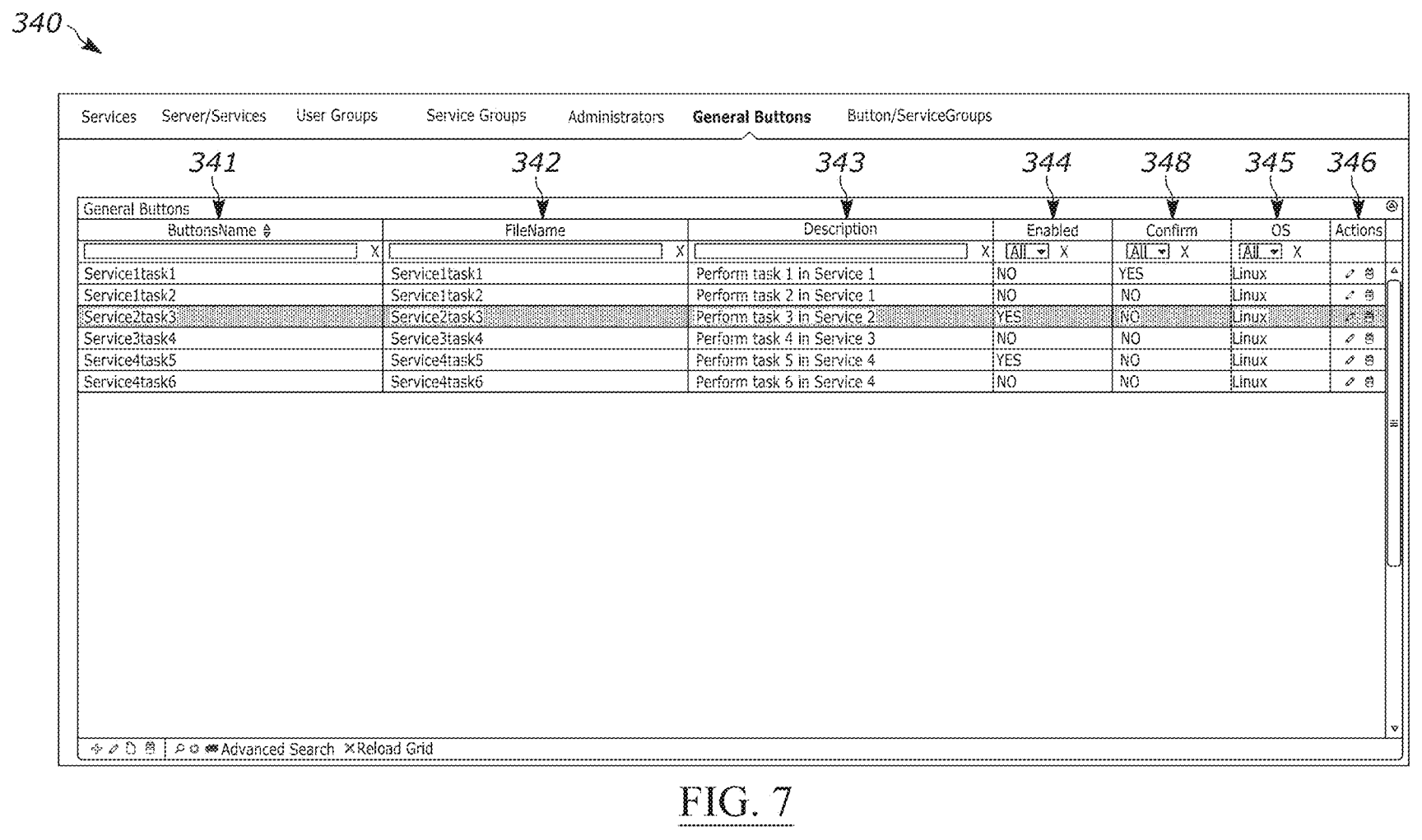

In FIG. 7, a general buttons UI 340 displays a list of general scripts that have been registered with the service management system 110. Each row of the general buttons UI 340 represents a general button record stored in the management data store 215. Each column of the general buttons UI 340 displays an attribute of the general button record. For each general button record, the general buttons UI 340 displays a name 341 of the general script, a file 342 associated with the general script, a brief description 343 of the general script, an enabled indicator 344 that shows whether the general script is enabled, an execution confirmation 348, and an operating system (OS) 345 associated with the general script. General scripts that are enabled may be associated with a service group. As a safety precaution, the operator portal 205 may prompt an operator for confirmation prior to executing the general script when the execution confirmation 348 is set to "YES."

The administrator may use the selectable elements in an actions 346 column to edit or delete a general script displayed in the general buttons UI 340. For example, the administrator may enable or disable a listed general script. The administrator may filter the general scripts displayed in general buttons UI 340 based on the displayed attributes. Specifically, the administrator may use a text entry box or a dropdown menu located near the top of each column to filter the list based on the attribute that corresponds to the respective column.

Figure 8:
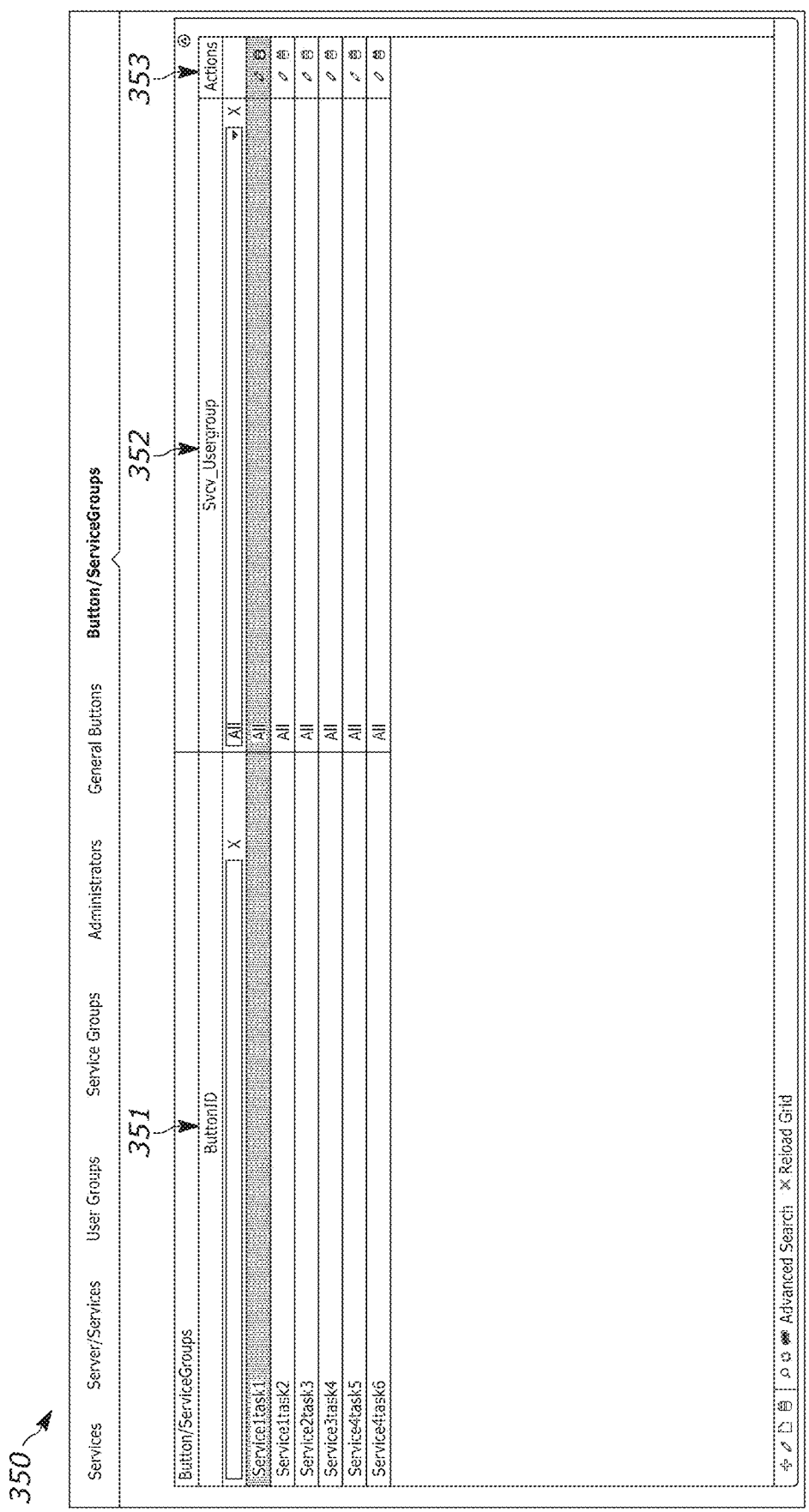

In FIG. 8, a groups UI 350 displays a list of general button records that have been associated with a service group. Each row of the groups UI 350 represents a different general button record stored in the management data store 215. Each column of the groups UI 350 displays an attribute of the general button record. For each listed general button record, the groups UI 350 displays a name 351 of the general script and a service group 352 associated with the general script. The value "All" in the service group 352 column indicates that the general script is associated with all of the service groups in the service management system 110.

The administrator may use the selectable elements in an action 353 column to edit or delete a general script displayed in the button and service group UI 350. For example, the administrator may change the service group associated with a listed general script. The administrator may filter the general scripts displayed in the groups UI 350 based on the displayed attributes. Specifically, the administrator may use a text entry box or a dropdown menu located near the top of each column to filter the list based on the attribute that corresponds to the respective column.

FIGS. 9-13 are example UIs presented to an authorized operator by the operator portal 205. In FIG. 9, a first listing UI 400, sorted by service, displays service and server combinations that are registered with the service management system 110. Each row of the first listing UI 400 represents a service and server combination that is stored in the management data store 215. Each column of the first listing UI 400 displays an attribute of the service and server combination. Specifically, the first listing UI 400 displays the service group 402 associated with the service, a name 404 of the service, a status 406 of the service, an asset lifecycle status 408, a domain name system (DNS) host name 410 of the server, a fully qualified domain name (FQDN) 412 of the server, a brief description 414 of the service, a physical location 416 of the server, an internet protocol (IP) address 418 of the server, and a model 420 of the server.

Each entry in the status 406 column includes two values for the service—for example, UP|UP, DOWN|DOWN, and DOWN|UP. The first value of the status 406 represents a reported status of the service. In other words, the result of executing the status script associated with the service on the server. The second value of the status 406 is an expected status for the service—that is, under normal operating conditions.

For example, DOWN|UP indicates the reported status of the service is down while the service is expected to be up. A DOWN|UP value may indicate a problem or issue that needs attention. In some implementations, the operator portal 205 may use different colors to differentiate between different value combinations. The different colors may also indicate the level of attention required by the operator. For example only, UP|UP may be displayed with a green background, DOWN|DOWN may be displayed with a blue background, and DOWN|UP may be displayed with a red background. The red background may indicate that operator attention is required to resolve an issue.

The operator may filter the displayed service and server combinations in the first listing UI 400 based on the attributes associated with each column. Specifically, the operator may use a text entry box or a dropdown menu located near the top of each column to filter the list based on the attribute that corresponds to the respective column. An operator may use a "group by" element 426 to switch between the first listing UI 400 and a second listing UI 424.

Figure 10:
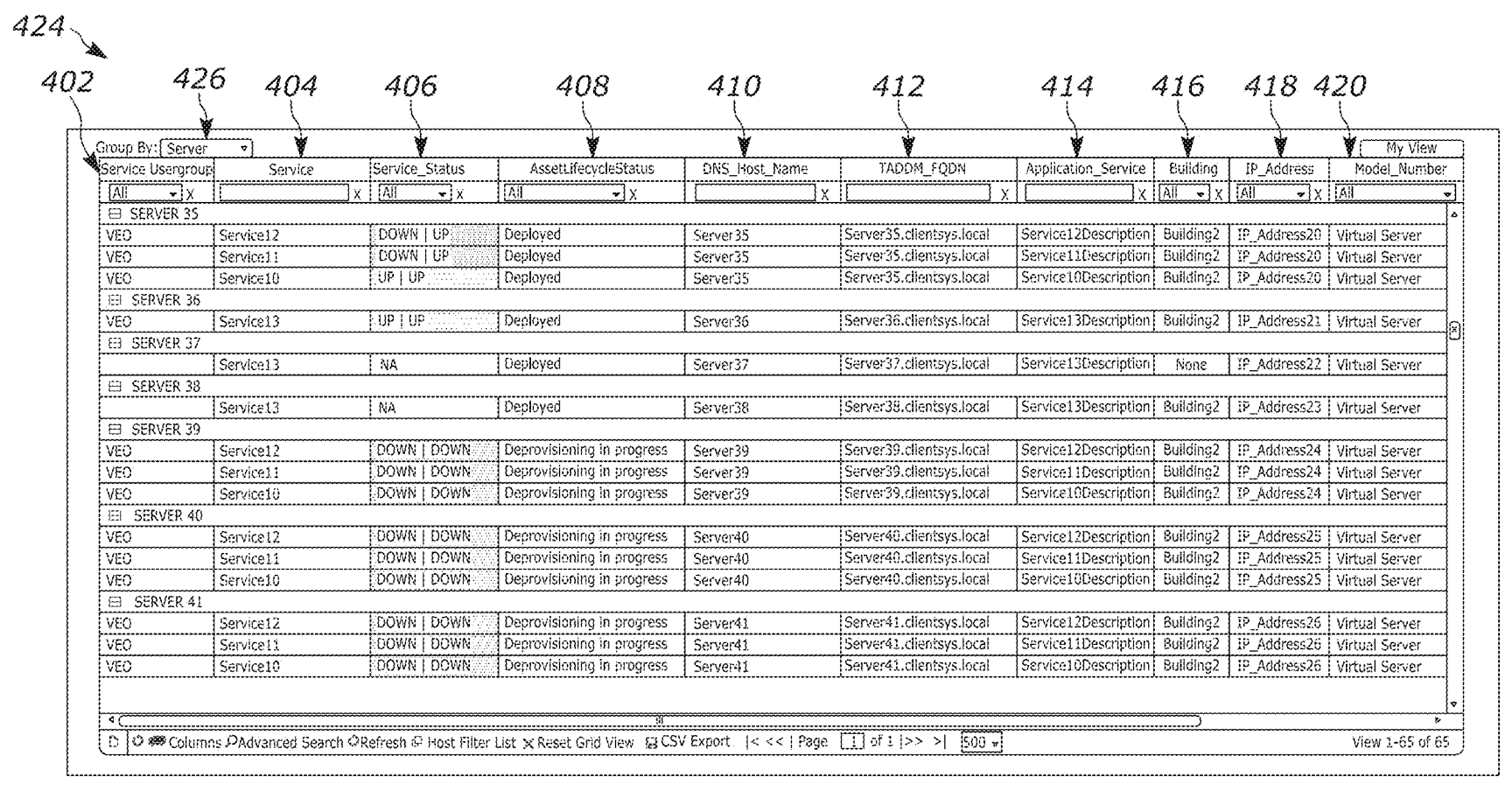

In FIG. 10, the second listing UI 424, sorted by server, displays service and server combinations registered with the service management system 110.

Figure 11:
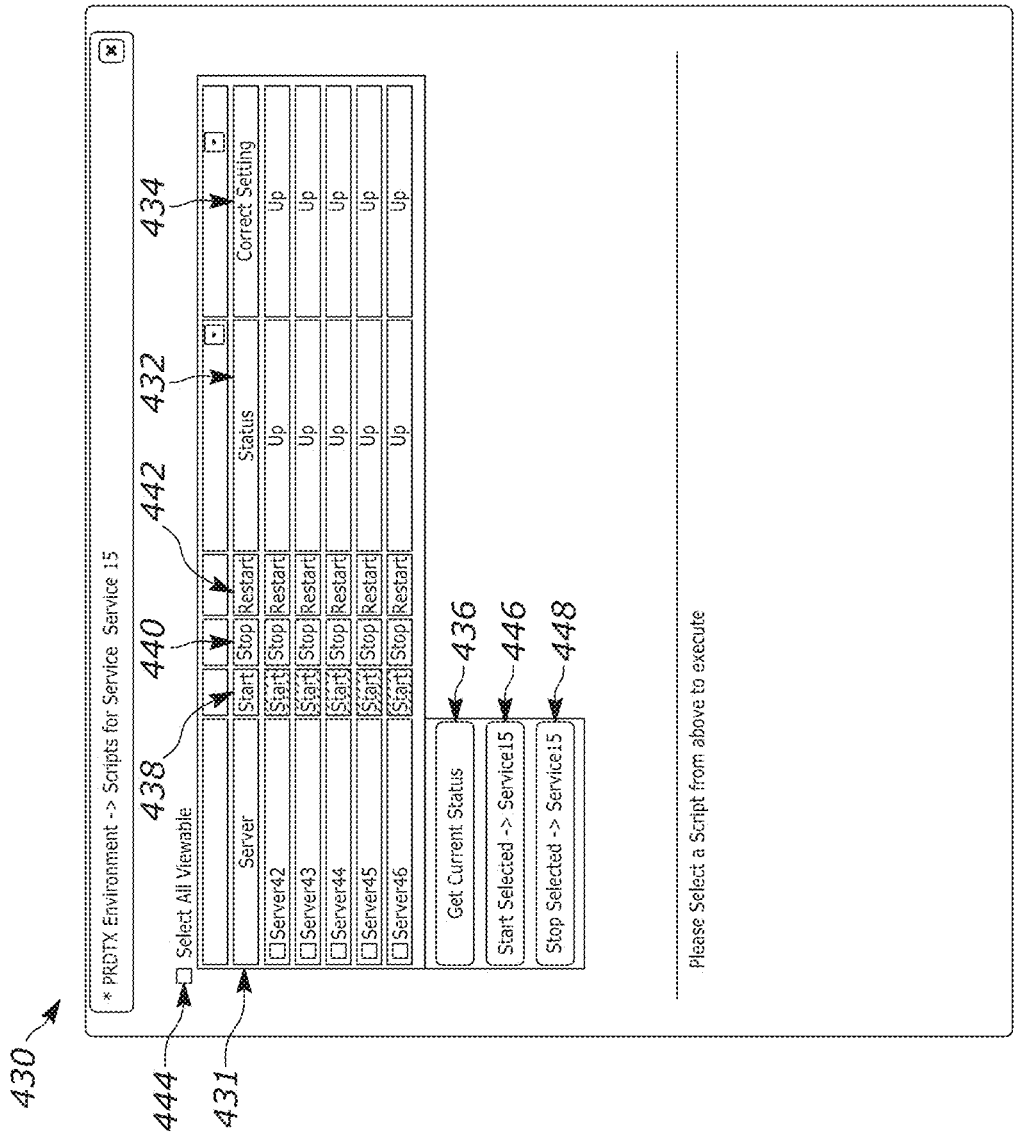

FIG. 11 is an example implementation of a service scripts UI 430, which allows an operator to start, stop, or restart a service on one or more servers associated with the service. The service script UI 430 displays each server 431 that is associated with the service, the current status 432 of the application on the server, and the correct setting 434—in other words, the expected status of the application on the server. The service script UI 430 includes a "get current status" button 436 that, when selected by the operator, obtains the current status of the service.

The service script UI 430 also includes buttons for each server that starts 438, stops 440, or restarts 442 the service on the corresponding server. The operator may choose all of the listed servers with a "select all viewable" element 444 or a subset of displayed servers using checkboxes next to each server. The service script UI 430 includes a "start selected" button 446 that starts the service on the servers selected by the operator, and a "stop selected" button 448 that stops the service on the servers selected by the operator.

Figure 12:
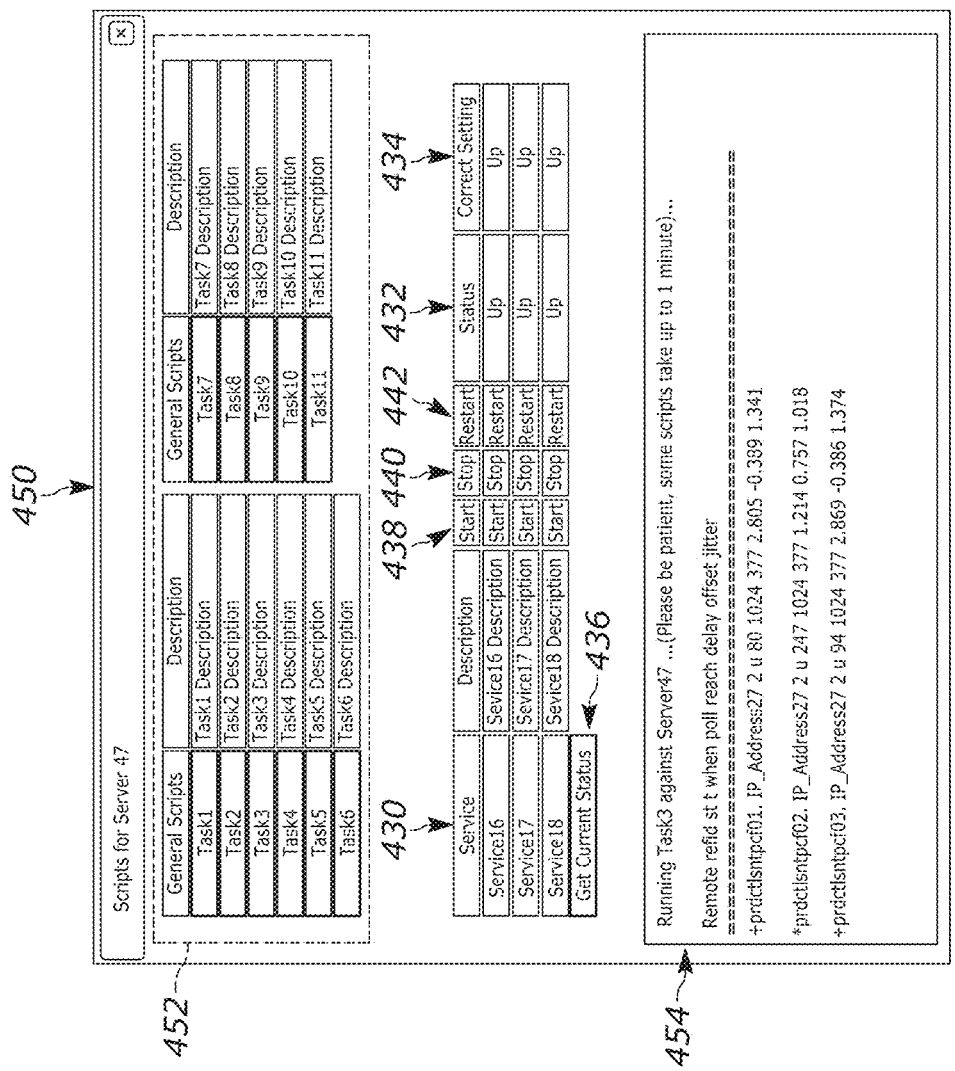

FIG. 12 is an example implementation of a server scripts UI 450 for a server named "Server47" (not listed in the views of FIG. 9 or 10). The operator portal 205 may present the server scripts UI 450 to the operator in response to selection of the server "Server47." For example, operator selection of the server name in the first listing UI 400 or the second listing UI 424 would display the server in the server scripts UI 450. The server scripts UI 450 includes a listing of general scripts 452 that may be executed on the server.

Each general script is associated with a separate button, the selection of which results in the execution of the corresponding general script on the server. For example, once the operator selects the button, the operator portal 205 instructs the remote execution module 225 to execute the selected general script on the server. The server scripts UI 450 includes a remote console window 454 that displays the status of the execution of the general script on the server. The remote execution module 225 provides the operator portal 205 with the results of the remote execution of the selected general script. The operator portal 205 displays the results of the remote execution in a remote console window 454. In FIG. 12, the remote console window 454 is depicted as displaying the results of executing an "Task3" on the server named "Server47."

Figure 13:
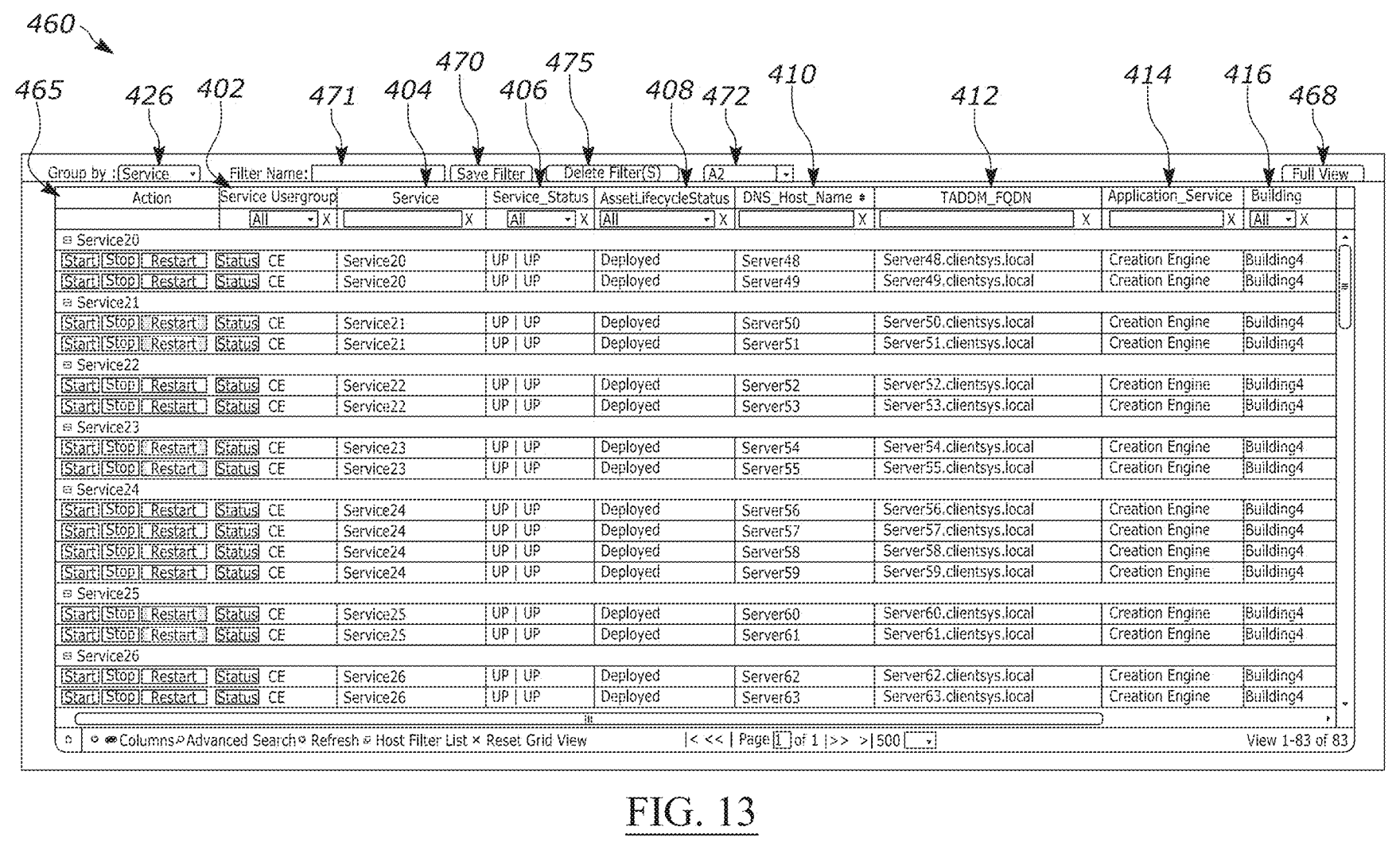

FIG. 13 shows an example implementation of a myview UI 460 that may be presented by the operator portal 205 to an operator with the username "User24." Each row of the myview UI 460 represents a service and server combination that is associated with the operator "User24." In other words, services that are shown are associated with the same service group as the operator "User24." The listed service and server combinations in the myview UI 460 are grouped by service. However, similar to the first listing UI 400 and the second listing UI 424, the operator may group the listed service and server combinations by server using the group by element 426.

The operator can control a listed service—for example, start, stop, restart, or obtain the status of the service—by selecting one of a set of action buttons 465. The myview UI 460 may show the set of action buttons 465 for each of the listed services. The myview UI 460 may gray out one of the set of action buttons 465 for a service to indicate that the operator cannot use the service management system 110 to perform the corresponding action for the service. In some implementations, a service may gray out one of the set of action buttons 465 if the service management system 110 does not have a location for a script that performs the corresponding action.

The operator can filter the service and server combinations displayed in the myview UI 460 based on the attributes associated with each column. Specifically, the operator may use a text entry box or a dropdown menu located near the top of each column to filter the list based on the attribute that corresponds to the respective column. All filters can be removed, showing every service, by selecting a "Full View" button 468.

The operator portal 205 allows the operator to store the current filtering scheme for later use by selecting a save filter button 470. For example, after the operator has filtered the service and server combinations using the text boxes and dropdown menus at the top of the columns, the operator may enter a filter name 471 and then select the save filter button 470. The operator may load a saved filter using the saved filter dropdown menu 472. The operator may also delete a saved filter by selecting a delete filter button 475.

In some implementations, in response to selection of the delete filter button 475, the operator portal 205 will delete all filters saved by the operator. In other implementations, in response to selection of the delete filter button 475, the operator portal 205 may display a list of saved filters. The operator may then select one of more of the saved filters for deletion.

Flowchart

Figure 14A:
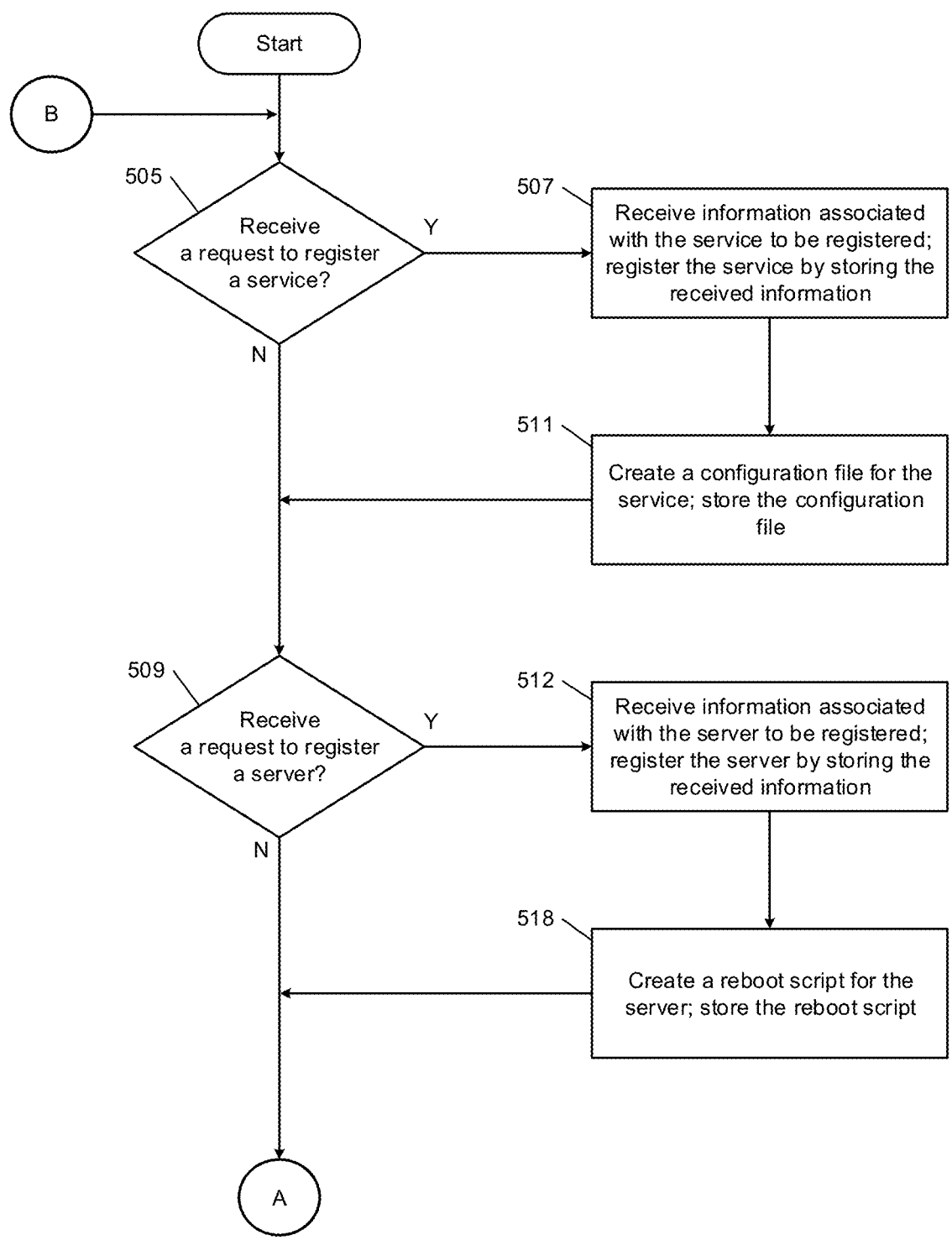
FIGS. 14A and 14B together are a flowchart of example operations performed by an implementation of the service management system.
Figure 14B:
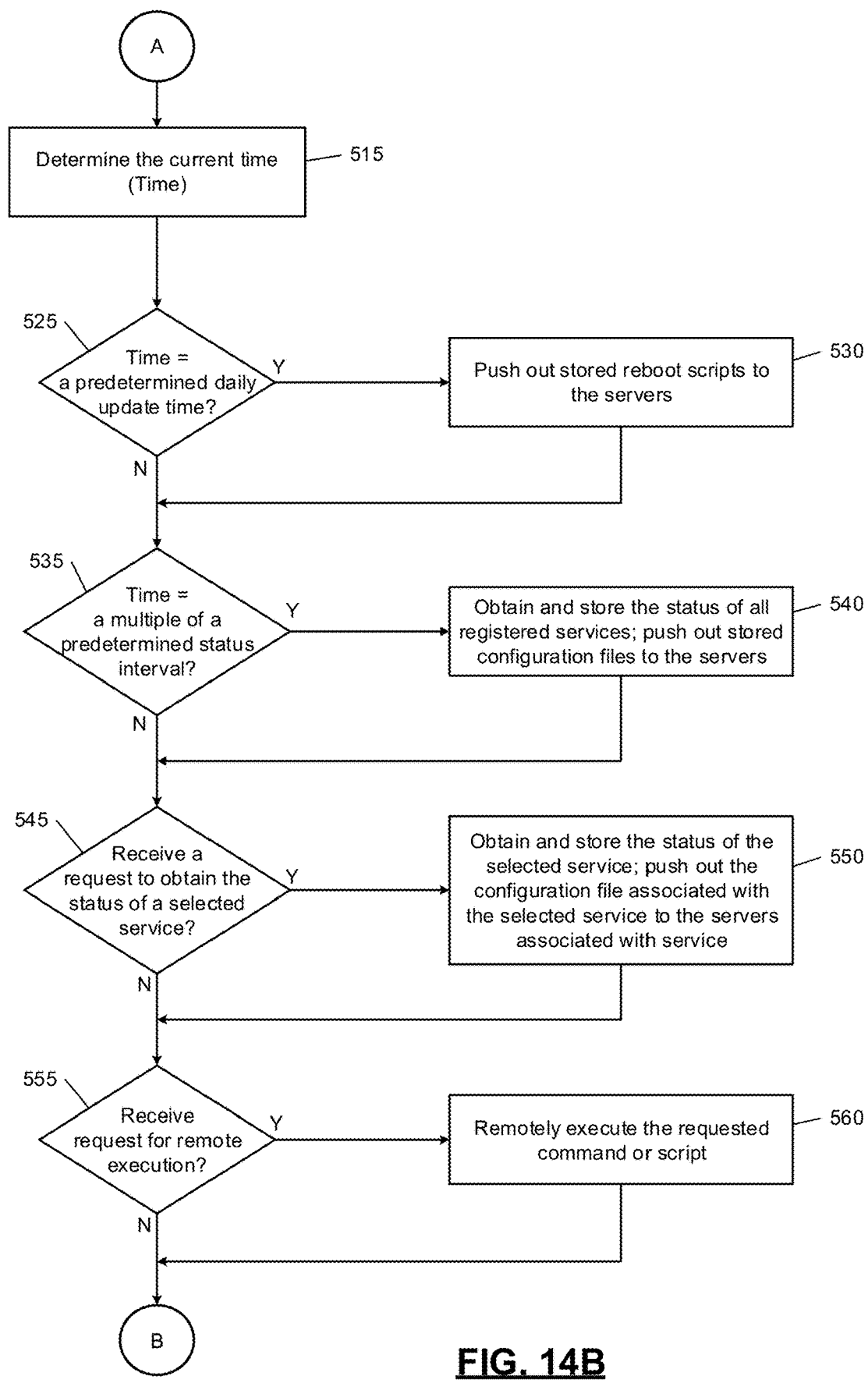

FIGS. 14A and 14B are a flowchart that describes registration and control of a service by the service management system 110. Control begins at 505 of FIG. 14A upon start of the service management system 110. At 505, control determines whether an operator has requested to register a service. For example, the service management system 110 may receive an input via the operator portal 205 to register a service. If so, control transfers to 507; otherwise, control progresses to 509.

At 507, control obtains information associated with the service to be registered. For example, the operator portal 205 may prompt the operator to provide the information associated with the service. The information may include the name of the service and a brief description of the service. Control registers the service by storing the information associated with the service. For example, the operator portal 205 may store the information as a service record in the management data store 215. Control then progress to 511, where control creates and stores a configuration file for the service. The configuration file includes the relative location of scripts and commands that may be used to manage the service—for example, to start, stop, or obtain the status of the service. In some implementations, control may automatically generate the configuration file based on the service record stored in management data store 215. In other implementations, control may receive a file from the operator and store the received file as the configuration file for the service in the management data store 215. Control then progresses to 509.

At 509, control determines whether an operator has requested to register a server. If so, control continues with 512; otherwise, control transfers to 515 of FIG. 14B. At 512, control obtains information associated with the server to be registered. For example, the operator portal 205 prompts the operator to provide the name of the server. The operator portal 205 may retrieve the address of the server and/or the operating system of the server from a configuration management database.

Control registers the server by storing the information associated with the server—such as the name of the server, the address of the server, and/or the operating system of the server. For example, the operator portal 205 may store the information as a server record in the management data store 215. Control may prompt the operator to associate the newly registered server with a registered service and store the service and server combination. For example, the operator portal 205 may prompt the operator to provide information about the service and server combination, such as the name of the service, whether the service should be automatically started upon restart of the server, the order in which the service should be brought online, and the expected status of the service on the server. The operator portal 205 then stores the information about the service and server combination by creating an association between a service record and the server record in the management data store 215. Control then progresses to 518.

At 518, control creates a reboot script for the registered server. In some implementations, control may automatically generate the reboot script for the server based on the stored service and server combinations associated with the server. In other implementations, control may receive a reboot script for the server from the operator. Control stores the generated or received reboot script. Control then progresses to 515 of FIG. 14B.

At 515 of FIG. 14B, control determines the current time (Time). Control then continues with 525, where control determines whether the current time is equal to a predetermined daily update time. If so, control progresses to 530; otherwise, control transfers to 535. The predetermined daily update time corresponds to a time of day when the service management system 110 pushes out stored reboot scripts to each registered server. In some implementations, the daily update time is set to a value that corresponds to the late evening—for example, 23:50 (11:50 PM). In other implementations, the daily update time may be set to any time of day. Each reboot script will be pushed to the corresponding server within 24 hours of being stored. At 530, control pushes out each stored reboot script to the appropriate server. Control then continues with 535.

At 535, control determines whether the current time aligns with a predetermined status interval. If so, control progresses to 540; otherwise; control transfers to 545. At 540, control obtains the status of all registered services. Control also pushes out each stored configuration file to the servers that are associated with the service that corresponds to the configuration file. The predetermined status interval is a value that corresponds to how often the statuses of the registered services are obtained. In some implementations, the predetermined status interval is 15 minutes, so control obtains the status of services at times that are multiples of 15 minutes (that is, 0 minutes, 15 minutes, and 45 minutes past the hour). In other implementations, the predetermined status interval may be equal to 30 minutes, one hour, or another period of time. Control continues with 545.

At 545, control determines whether an operator has requested the current status of a specific service. If so, control progress to 550; otherwise, control transfers to 555. At 550 control obtains and stores the current status of the selected service. Control also pushes the stored configuration file associated with the selected service to each server associated with the selected service. Control then continues with 555.

At 555, control determines whether an operator has requested the remote execution of a command or script on one or more registered servers. If so, control progresses to 560; otherwise, control returns to 505 of FIG. 14A. At 560, control remotely executes the requested script or command. For example, the operator portal 205 may instruct the remote execution module 225 to execute a start or stop script for a registered service or a general script on a server that corresponds to the execution request. Control then returns to 505 of FIG. 14A.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A service management system comprising:
a management data store configured to store:
  configuration information for a service; and
  reboot information for a server that hosts the service;
an execution module configured to:
  generate a configuration file based on the configuration information, wherein the configuration file includes a location of at least one management script associated with the service and wherein the at least one management script is stored on the server;
  generate a reboot script based on the reboot information;
  push (i) the configuration file and (ii) the reboot script out to the server;
  obtain a status of the service on the server by executing the at least one management script on the server; and
an operator portal configured to create a first user interface for display to a user, wherein the first user interface includes:
  a name of the service,
  a name of the server, and
  the status of the service.

2. The service management system of claim 1 wherein:
the management data store is configured to store a button record that includes a general script file that may be executed on the server;
the execution module is configured to selectively execute the general script file on the server;
the name of the server is a first user selectable element; and
the operator portal is configured to, in response to selection of the first user selectable element:
  create a second user interface for display to the user that includes a second user selectable element that is associated with the button record, and
  in response to selection by the user of the second user selectable element, instruct the execution module to execute the general script file on the server.

3. The service management system of claim 1 wherein:
the first user interface includes (i) a plurality of names of services and (ii) a user input element;
the operator portal is configured to (i) filter the plurality of names of services based on input received via the user input element and (ii) create a second user interface for display to the user; and
the second user interface includes the filtered plurality of names of services.

4. The service management system of claim 1 wherein:
the configuration file includes a location of a second management script (i) associated with the service and (ii) stored on the server;
the execution module is configured to selectively execute the second management script on the server;
the name of the service is a first user selectable element;
the operator portal is configured to, in response to selection of the first user selectable element:
  create a second user interface for display to the user that includes a second user selectable element that is associated with the second management script, and
  in response to selection of the second user selectable element, instruct the execution module to execute the second management script on the server; and
execution of the second management script causes the service to start or stop.

5. The service management system of claim 1 further comprising a scheduling module configured to:
instruct the execution module to push the configuration file out to the server at a first predetermined interval; and
instruct the execution module to push the reboot script out to the server at a second predetermined interval,
wherein the second predetermined interval is greater than the first predetermined interval.

6. The service management system of claim 5 wherein:
the scheduling module is configured to instruct the execution module to obtain the status of the service at the first predetermined interval, and
the operator portal is configured to, independent of operation of the scheduling module and in response to receiving a first input from the user, instruct the execution module to obtain the status of the service.

7. The service management system of claim 5 wherein (i) the first predetermined interval is 15 minutes and (ii) the second predetermined interval is 24 hours.

8. The service management system of claim 1 wherein:
the management data store is configured to store the status of the service, and
the operator portal is configured to retrieve the status of the service from the management data store.

9. The service management system of claim 1 wherein:
the reboot script includes instructions related to starting the service on the server after the server is rebooted,
the first user interface includes an expected status of the service, and
the expected status is based on the instructions included in the reboot script.

10. The service management system of claim 1 further comprising an alert module configured to:
receive a result of execution of the at least one management script from the execution module;
based on the result, determine whether the status of the service cannot be obtained; and
in response to determining that the status of the service cannot be obtained, generate and send an alert to the user.

11. A method comprising:
obtaining configuration information for a service and reboot information for a server that hosts the service;
generating a configuration file based on the configuration information, wherein the configuration file includes a location of at least one management script associated with the service and wherein the at least one management script is stored on the server;
generating a reboot script based on the reboot information;

pushing (i) the configuration file and (ii) the reboot script out to the server;

obtaining a status of the service on the server by executing the at least one management script on the server; and creating a first user interface for display to a user, wherein the first user interface includes:
- a name of the service,
- a name of the server, and
- the status of the service.

12. The method of claim 11 further comprising:

storing a button record that includes a general script file that may be executed on the server;

creating, in response to selection of a first user selectable element, a second user interface for display to the user that includes a second user selectable element that is associated with the button record, wherein the name of the server is the first user selectable element; and in response to selection of the second user selectable element, executing the general script file on the server.

13. The method of claim 11 wherein the first user interface includes (i) a plurality of names of services and (ii) a user input element, the method further comprising:

filtering the plurality of names of services based on input received via the user input element; and creating a second user interface for display to the user, wherein the second user interface includes the filtered plurality of names of services.

14. The method of claim 11 wherein the configuration file includes a location of a second management script (i) associated with the service and (ii) stored on the server, the method further comprising:

creating, in response to selection of a first user selectable element, a fourth second user interface for display to the user that includes a second user selectable element that is associated with the second management script, wherein the name of the service is the first user selectable element; and in response to selection of the second user selectable element, executing the second management script on the server, wherein execution of the second management script causes the service to start or stop.

15. The method of claim 11 wherein:

pushing the configuration file out to the server includes pushing out the configuration file at a first predetermined interval;

pushing the reboot script out to the server includes pushing out the reboot script at a second predetermined interval; and the second predetermined interval is greater than the first predetermined interval.

16. The method of claim 15 wherein obtaining the status of the service includes obtaining the status (i) at the first predetermined interval and (ii) in response to receiving a first input from the user.

17. The method of claim 15 wherein (i) the first predetermined interval is 15 minutes and (ii) the second predetermined interval is 24 hours.

18. The method of claim 11 wherein:

the reboot script includes instructions related to starting the service on the server after the server is rebooted, the first user interface includes an expected status of the service, and the expected status is based on the instructions included in the reboot script.

19. The method of claim 11 further comprising:

receiving a result of execution of the at least one management script on the server;

determining, based on the result, whether the status of the service cannot be obtained; and in response to determining that the status of the service cannot be obtained, generating and sending an alert to the user.

20. A non-transitory computer-readable medium storing processor-executable instructions, the instructions comprising:

storing, in a management data store, (i) configuration information for a service and (ii) reboot information for a server that hosts the service;

generating a configuration file based on the configuration information, wherein the configuration file includes a location of at least one management script associated with the service and wherein the at least one management script is stored on the server;

generating a reboot script based on the reboot information;

pushing (i) the configuration file and (ii) the reboot script out to the server;

obtaining a status of the service on the server by executing the at least one management script on the server; and creating a first user interface for display to a user, wherein the first user interface includes:
- a name of the service,
- a name of the server, and
- the status of the service.

* * * * *

UNITED STATES PATENT AND TRADEMARK OFFICE
CERTIFICATE OF CORRECTION

PATENT NO. : 10,812,622 B1  
APPLICATION NO. : 16/371062  
DATED : October 20, 2020  
INVENTOR(S) : Glenn Jared Komsky et al.

Page 1 of 1

It is certified that error appears in the above-identified patent and that said Letters Patent is hereby corrected as shown below:

On the Title Page

Column 1, (22) Filed, Line 1     After "2019", insert --¶(65) Prior Publication Data US 2020/0314210 A1 Oct. 01, 2020--

In the Claims

Claim 14, Column 19, Line 33     "fourth second" should be --second--

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*